United States Patent
Mitchnick et al.

[11] Patent Number: 5,391,432
[45] Date of Patent: Feb. 21, 1995

[54] ANTISTATIC FIBERS

[76] Inventors: Mark Mitchnick, P.O. Box 1451, Wainscott, N.Y. 11975; Mamoun Muhammed, Eketorpsvägen 25, S-18261 Djursholm-(Stockholm), Sweden

[21] Appl. No.: 54,039

[22] Filed: Apr. 28, 1993

[51] Int. Cl.$^6$ .............................. B32B 19/00
[52] U.S. Cl. .................... 428/357; 428/373; 428/372; 428/378; 428/379; 428/601; 428/403; 428/398; 428/392; 428/394
[58] Field of Search ............... 428/357, 373, 372, 378, 428/379, 394, 392, 401, 398, 403

[56] References Cited

U.S. PATENT DOCUMENTS

| | | | |
|---|---|---|---|
| 3,958,066 | 5/1976 | Imamura et al. | 428/372 |
| 4,185,137 | 1/1980 | Kinkel | 428/372 |
| 4,309,479 | 1/1982 | Naruse et al. | 428/372 |
| 4,387,073 | 6/1983 | Westbrook | 420/507 |
| 4,420,534 | 12/1983 | Matsui et al. | 428/372 |
| 4,756,969 | 7/1988 | Takeda | 428/372 |
| 4,806,424 | 2/1989 | Schultz | 428/372 |
| 4,835,056 | 5/1989 | Sanders et al. | 428/372 |
| 4,997,712 | 3/1991 | Lin | 428/372 |
| 4,999,244 | 3/1991 | Morimoto | 428/372 |
| 5,213,892 | 5/1993 | Bruckner | 428/372 |

OTHER PUBLICATIONS

Japanese Patent Application (PTO 93-2041).

*Primary Examiner*—Patrick J. Ryan
*Assistant Examiner*—Merrick Dixon
*Attorney, Agent, or Firm*—Weingarten, Schurgin, Gagnebin & Hayes

[57] ABSTRACT

Disclosed are electrically conductive fibers which include zinc oxide particles having a substantially rod shape.

12 Claims, 6 Drawing Sheets

ANTISTATIC FIBERS

This invention relates in general to the preparation of fabrics having antistatic/conductive properties.

BACKGROUND OF THE INVENTION

Fabrics which possess conductive properties have been produced by coating a fiber-forming nonconductive polymer with a conductive layer composed of a polymer containing conductive particles, e.g., metal particles such as carbon black. Carbon black-containing conductive fibers are difficult and expensive to produce and possess a color which is limited to black or gray.

Conductive fibers are manufactured using a drawing step which elongates the fiber and during which the chain structure of the conductive particles within the fiber is often disrupted. Often, the drawing step results in a decrease and sometimes a substantial loss of conductivity of the fiber.

U.S. Pat. Nos. 4,420,534 and 4,457,973, disclose conductive composite filaments which are formed by conjugate-spinning a conductive component which includes electrically conductive titanium, tin, zinc, iron, aluminum or magnesium oxide particles and a thermoplastic polymer and/or a solvent-soluble polymer and a non-conductive fiber-forming polymer. Conductivity is maximized by maximizing dispersion of the conductive particle in the polymer using dispersants. In addition, these patents stress that particles conferring extreme whiteness are preferred.

Prior art disclosures of metal oxides include preparations of spherical zinc or titanium oxide particles (U.S. Pat. Nos. 5,032,390, 5,132,104, EPO 433 086 A1, U.S. Pat. Nos. 4,606,869, 3,397,257, 4,543,341, 4,808,398, 2,898,191, 4,9233,518, and 4,721,610), crystalline metal oxides (U.S. Pat. Nos. 5,093,099, 5,091,765, 4,261,965, 2,900,244, and 4,722,763), including crystalline whisker-shaped zinc oxide (U.S. Pat. No. 5,066,475), and needle-shaped zinc oxide particles (U.S. Pat. Nos. 5,102,650, 5,171,364 and 5,132,104). U.S. Pat. No. 5,066,475 relates to whiskers of zinc oxide having a crystal structure which includes a central body and four needle crystal projections radially extending therefrom, and is useful in reinforcing materials. U.S. Pat. No. 5,012,650 relates to needle-like electrically conductive zinc oxide filler which is useful for its low specific volume resistance and electrical conductivity. U.S. Pat. No. 5,132,104 discloses a method of preparing conductive needle-like zinc carbonate having an average length of 10–100 μm, an average thickness of 0.5–10 μm, and an aspect ratio of at least three. Electron micrographs of the needle-like zinc carbonate reveals a complex and highly disorganized matrix.

It is an object of the invention to provide fibers, e.g., as are used in textiles, such as carpets, upholstery, clothing, ropes, hairbrushes, wigs, etc., which possess conductive and antistatic properties. It is another object of the invention to provide antistatic fibers using zinc oxide rod particles which are ultra-fine enough to provide transparency and reflectivity, and thus to allow for color additives based on any desired color. Yet another object of the invention is to provide antistatic fibers which are highly conductive and yet are not brittle. It is another object of the invention to provide fibers for use in textiles containing zinc oxide rod-shaped particles of dimensions which allow the particles to form a conductive coating. It is also an object of the invention to provide fibers comprising zinc oxide rods which have a high enough ratio of surface area to volume or weight to retain inter-particle contact, and thus to retain conductivity and antistatic properties. Zinc oxide particles of the invention, because they are rod-shaped, may assume a side-by-side or end-on-end arrangement or a criss-cross packing arrangement, once the fiber is drawn into its desired length, such that there are relatively few gaps between the particles.

SUMMARY OF THE INVENTION

The invention is based on the discovery that zinc oxide rod-shaped particles provide electroconductivity and thus confer antistatic properties to particle-containing fibers used in the manufacture of textiles without affecting the color, appearance, or tactile properties of the resulting product.

The invention features a conductive fiber comprising a synthetic or natural fiber-forming polymer in combination with zinc oxide particles having a substantially rod shape.

Conductive fibers of the invention include a fiber-forming component which is manufactured in a process which combines the fiber-forming polymer with zinc oxide rod-shaped particles. Conductive fibers of the invention will also include conductive composite fibers, i.e., including a conductive component containing conductive zinc oxide particles and a nonconductive component bonded thereto. The nonconductive component protects the conductive component and confers strength to the fibers.

As used herein, "rod" refers to a zinc oxide particle having an aspect ratio (i.e., ratio of length/diameter) of at least two, preferably at least three to four; a length of less than 2000 nm, preferably less than 300 nm, most preferably less than 200 nm; and a diameter of less than 1000 nm, preferably less than 150 nm, most preferably less than 100 nm. Thus, an aspect ratio of two will include length/diameter dimensions of 2000 nm/1000 nm, 300 nm/150 nm, 200 mm/100 nm, etc., and dimensions falling in between or below these ratios. An aspect ratio of three will include length/diameter dimensions of 2000 nm/600 nm, 300 nm/100 nm, 200 nm/65 nm, etc., and dimensions falling in between or below these numbers. An aspect ratio of four or more will be determined accordingly; for example, an aspect ratio of four will have length/diameter dimensions falling below and including 2000 nm/500 nm. "Substantially rod shape" refers to an elongated spherical shape, e.g., having an aspect ratio of at least two, or a flattened rod-shape, such as the shape of a green bean. "Substantially spherical cross-section" refers to spherical or flattened spherical cross-sections (e.g., the cross-section of a bean).

The size of the rod-shaped particles described herein provides an excellent surface area and allows for excellent contact between the particles, thus maximizing conductivity. The rod shape of the particles allows the particles to remain in contact even when the medium in which they are dispersed is "drawn" or thinned, e.g., as a result of the drawing step in fiber production.

Other preferred embodiments include the following. The rod shaped particles may have a substantially spherical cross-section with an aspect ratio of at least two and preferably three. The zinc oxide particles of the invention may comprise from 1% to as much as 90% of the composition by weight, depending upon the desired thickness and color of the composition. More preferably, the zinc oxide rods comprise between 5% and 80%, or 10% and 70%, or 20% and 60% of the composition; most preferably, between 30% and 50% of the composition by weight.

The invention also features a unitary, elongated, electrically conductive, bi-component fiber comprising a conductive component comprising conductive zinc oxide particles having a substantially rod shape and at least one polymer selected from the group consisting of thermoplastic polymers and solvent-soluble polymers, bonded to an electrically non-conductive component composed of a fiber-forming polymer.

The small size and shape of the rod-shaped zinc oxide particles described herein provides another advantage in that these particles, when used in relatively low concentrations, e.g., less than 60% of the product by weight, are essentially transparent to visible light. Thus, the presence of the rod-shaped particle imparts conductivity but does not affect the aesthetics of the finished product. The invention allows for production of colored as well as transparent products containing fibers of the invention. The transparent quality is obtained by including in the fiber small rod-shaped particles, i.e., having a length of less than 300 nm and a diameter of less than 100–150 nm. Thus, additives of any desired color may be used in a transparent fiber mixture to provide a textile of a desired color. Larger particles, i.e., having a length longer than 300 nm and a diameter greater than 100–150 nm, are useful for fibers in which the opacity of the zinc oxide is an asset, e.g., white fibers, or white or colored particles.

Zinc oxide particles which are not rod-shaped tend to aggregate and clump upon drawing of the fiber composition into which they are dispersed. This, in turn, dramatically reduces the conductive properties of a fiber containing such particles. For example, zinc oxide spheres have a geometry and shape which allows for single points of contact between particles. Thus, high concentrations of spheres are required to ensure continuous contact between particles. Rod-shaped particles possess a geometric shape which allows for numerous and often uninterrupted inter-particle contacts in a variety of arrangements of the rods. It is preferable that the conductivity of a conductive fiber does not substantially diminish upon drawing of the fiber. This may be achieved by including substantially rod-shaped zinc oxide particles in the fiber composition.

Fibers of the invention include zinc oxide particles having improved weight efficiency in that their rod shape allows them to assume relative particle orientations so as to maximize their conductive properties. For example, less zinc oxide (by weight) is needed in the rod-shaped form than in the spherical form to give equal or better conductivity. This is true because conductivity depends on particle/particle contact, which is largely a particle surface phenomenon, i.e., relatively less particle thickness is required relative to particle surface area. Thus, compositions of the invention provide a large surface area and require relatively less zinc oxide by weight for equivalent or better conductivity.

Another advantage of compositions of the invention is that the rod shape of the particles promotes side-by-side, end-on-end, and criss-cross arrangements of the rods rather than the stacking or clumping tendency of crystals or spheres. Thus, fibers of the invention provide a relatively even layer of zinc oxide, with consequent uniform conductivity at the surface. As a result of this superior particle orientation, fibers of the present invention will be easier to draw. Rod shaped zinc oxide particles do not tend to agglomerate and thus will disperse evenly within the liquid fiber form.

As used herein, "conductive fiber", "conductive component", or "fiber-forming polymer" refer to any polymer which can be provided in a fibrous form and can bind conductive zinc oxide particles; these include but are not limited to thermoplastic and thermosetting polymers, for example, polyamides, such as nylon-6, nylon-11, nylon-12, nylon-66, nylon-610, nylon-612, etc., polyesters, such as polyethylene terephthalate, polybutylene terephthalate, polyethylene oxbenzoate, etc., polyolefins, such as polyethylene, polypropylene, etc., polyethers, such as polymethylene oxide, polyethylene oxide, polybutylene oxide, etc., vinyl polymers, such as polyvinyl chloride, polyvinylidene chloride, polystyrene, etc., polycarbonates, and copolymers and mixtures consisting mainly of these polymers. The solvent soluble polymers include acrylic polymers containing at least 85% by weight of acrylonitrile, modacrylic polymers containing 35–85% by weight of acrylonitrile, cellulose polymers, such as cellulose, cellulose acetate, vinyl alcohol polymers, such as polyvinyl alcohol and saponified products thereof, and polyurethane, polyurea, and copolymers or mixtures consisting mainly of these polymers. As these polymers, polymers having low fiber-forming ability also may be used but polymers having fiber-forming ability are preferable. "Natural fiber" includes but is not limited to cotton, wool, wood, or silk.

Polymers having crystallinity of not less than 40%, particularly not less than 50%, more preferably not less than 60% are preferable. The above described polyamides, polyesters and acrylic polymers have crystallinity of about 40–50% and, as the polymers having crystallinity of not less than 60%, mention may be made of polyolefins, such as crystalline polyethylene, crystalline polypropylene, polyethers, such as polymethylene oxide, polyethylene oxide, etc., linear polyesters, such as polyethylene adipate, polyethylene sebacate, polycaprolactone, polycarbonates, polyvinyl alcohols, cellulose and the like.

Fiber-forming polymers useful in the invention may be made of polymers capable of being melt spun, dry spun and wet spun, for example, among the above-described thermoplastic polymers and solvent soluble polymers, fiber-forming polymers may be used. Among the fiber-forming polymers, polyamides, polyesters and acrylic polymers are preferable. To the fiber-forming polymers may be added various additives, such as delusterants, pigments, coloring agents, stabilizers, antistatic agents (polyalkylene oxides, various surfactants).

The invention also includes methods of producing conductive fibers and conductive textiles containing conductive fibers. Conductive fibers of the invention comprise a fiber-forming polymer and substantially rod-shaped zinc oxide particles. These methods include the steps of (a) combining a fiber-forming polymer with zinc oxide rod-shaped particles made from a metastable zinc oxide precipitate to form a fiber-forming composition, (b) drawing the composition into a conductive fiber, and optionally (c) assembling multiples of the fiber into a textile.

The metastable zinc oxide precipitate is formed by bringing into contact in an aqueous solution zinc ions, ammonium ions, and a carbonate source to form a precipitate, separating and optionally calcining the precipitate to zinc oxide particles such that a metastable precipitate is formed in which the morphology and size of the particles is controlled by maintaining, during the precipitation: a temperature between 10 to 40° C.; a pH between 5 and 10; and wherein at least one of the zinc ion and carbonate source is progressively made available to the solution at a precipitation limiting rate.

The above-defined method is in contrast to prior art methods in which a high pH solution of all the precipitant ions (with the zinc as zincate) is caused to precipitate by lowering of the pH. The present invention avoids the production of undesirable high pH artifacts such as microprecipitates of ZnOH which can act as seeds for the uncontrolled growth of zinc carbonate complexes, by initially setting the pH of the mother liquor. In this fashion, high quality, substantially uniform metastable complexes can be reproduceably precipitated with sizes and morphologies which possess interesting rheological properties.

Preferably, the zinc oxide is formed by calcining the precipitate to form zinc oxide particles; the calcination temperature is within the range 125°–340° C., more preferably, within the range of 200°–270° C. Preferably, the temperature is maintained between 15 to 30° C. during precipitation.

As used herein, "conductive" and "antistatic" refer to the ability to transmit electricity. Due to the improved inter-particle contact of zinc oxide rod-shaped particles, relatively less zinc oxide rod particles (wt/wt polymer) are required to give good conductivity. An undoped zinc oxide rod preparation with a particle size of about 75 nm length/1450 nm diameter will possess a resistivity of approximately $1 \times 10^{13}$ ohm.cm.

Conductive fibers of the invention will have a resistivity of at least 100 ohm.cm, preferably at least 1000 ohm.cm, more preferably at least 10,000 ohm.cm, and most preferably at least 50,000–1,000,000 ohm.cm. High resistivities (e.g, greater than 10,000 ohm.cm) are preferred for certain uses. The resistivity of the zinc oxide rod particle preparation may be from $10^{-1}$–$10^8$ ohm.cm, preferably $10^0$–$10^6$ ohm.cm, most preferably $10^1$–$10^5$ ohm.cm.

The invention also features a conductive fiber and a conductive textile produced according to the above-described method. The textile may be selected from the group comprising carpets, upholstery, and garments.

These and other properties of the invention will be understood by those skilled in the art from the description herein and from the claims.

DESCRIPTION

The invention encompasses conductive fibers comprising zinc oxide particles having a substantially rod shape and methods of preparing such fibers. Described below are methods for preparing rod-shaped zinc oxide particles, and methods for the manufacture of fibers containing such particles.

First, the drawings will be described briefly.

DRAWINGS

PREPARATION OF ZINC OXIDE RODS

Figure 1:
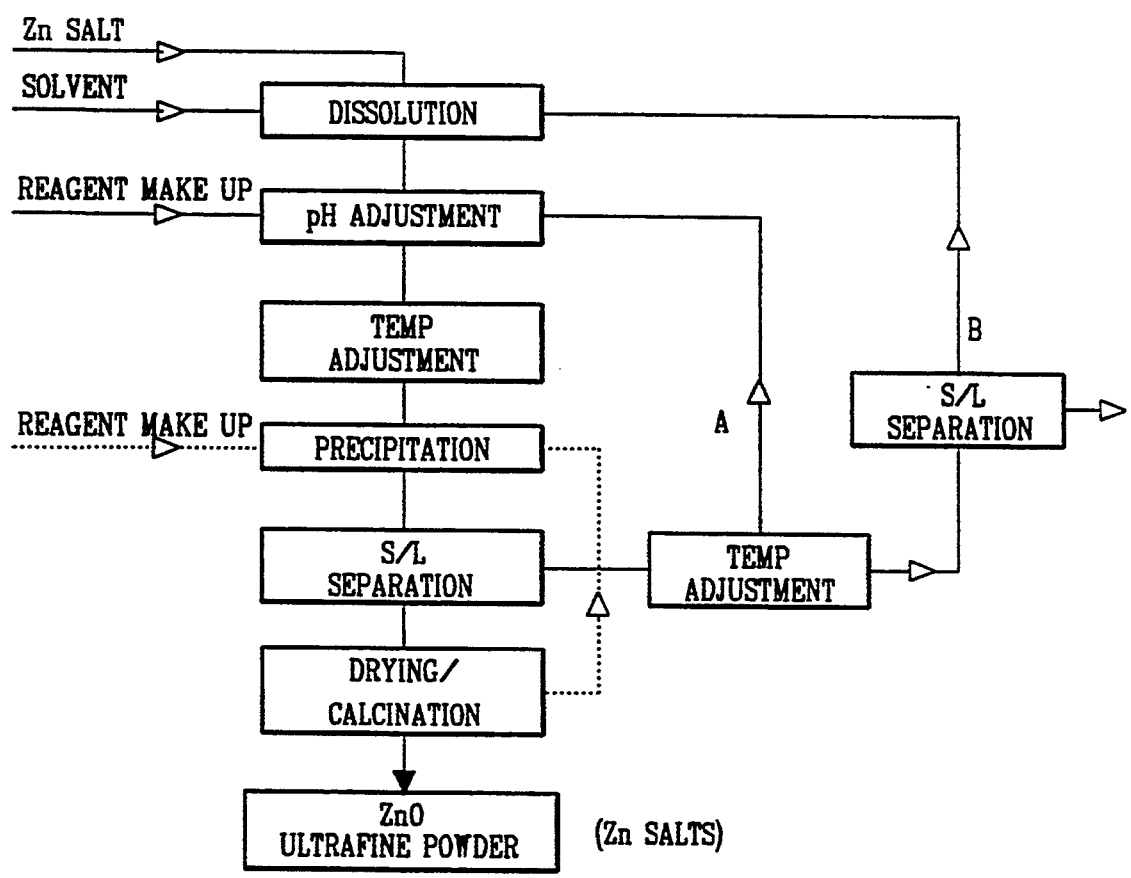
FIG. 1 is a flow diagram of a first process for producing the zinc oxide particles described herein.

Described below are methods of producing ultrafine zinc oxide, carbonates and oxalates with defined particle morphologies. Techniques for the production of such defined-morphology particles avoid the deficiencies of the prior art calcination or decomposition steps, and are amenable to simultaneous or sequential co-precipitant doping.

Zinc oxide particles may be prepared in the form of rods in the size range 3 to 500 nm and even up to 10,500 nm in length, preferably 50–6,000 nm, more preferably 100–500 nm in length; a diameter of between 1 and 3,500 nm, preferably, between 10 and 2,000 nm, more preferably 100 and 150 nm and 10 to 150 nm in diameter, most preferably about 50 to 150 nm diameter, are most useful in the invention. The rods will generally have a circular cross section and comprise X-ray amorphous material. As used in this specification 'rods' have an aspect ratio of the order of at least 2–2.5, or at least 3, or more.

Typically, the particles will display a substantially homogenous size and aspect ratio distribution with micrographs of the rods showing greater than 75% and even up to 90% of the particles having a substantially similar size and aspect ratio. For instance, within a rod population of nominal aspect ratio 3 and diameter 100 nm, it is possible to produce populations in which 75% of the particles fall within an aspect ratio range of 2–4 and diameter range 50 to 150 nm.

Such zinc oxide particles with defined sizes and morphologies, including those produced by the techniques below, show interesting rheological properties.

As conductors, the controlled morphology particles of the invention can be used as fillers incorporated at conventional proportions into textiles, e.g., carpets, to provide low specific volume resistance. Described and claimed in detail herein are fibers containing zinc oxide rods which are useful as static dispersants in textiles, e.g., fabrics, carpets, upholstery, etc. Particles with higher aspect ratios (e.g., 4–5) are generally preferred in these applications to enhance interparticle contact and thereby increase conductivity/unit weight. The rheological properties of the particles assure enhanced dispersability within the polymer. Fibers and textiles containing such rods will not exhibit the static electricity properties found in many fibers, e.g. clothing and carpets, known in the art.

Also described herein in detail are methods for forming conductive textiles by combining a fiber-forming polymer with a metastable zinc oxide precipitate, wherein the metastable precipitate is formed by contacting in an aqueous solution zinc ions, ammonium ions, and a carbonate source to form a precipitate, the resulting precipitate is separated and optionally calcined to zinc oxide, in which a metastable precipitate is formed by controlling the morphology and size of the particles by maintaining, during precipitation: a temperature between 10 and 40° C., preferably 15 to 30° C. and more preferably 20 to 22° C.; a pH between 5 and 10; and wherein at least one of the zinc ion and/or carbonate source is progressively made available to the solution at a precipitation limiting rate.

Zinc oxide particles produced according to the procedure described herein are ultrafine precipitates of controlled size and morphology produced by the above method and defining substantially homogeneous populations of rods with a narrow diameter and aspect ratio distribution.

The precipitate which forms as a metastable mixed complex of zinc, or zinc and some other cation such as ammonium or a dopant, and hydroxy, bicarbonate, carbonate or oxalate, etc., may be recovered as the salt by conventional techniques or alternatively must be calcined to produce zinc oxide particles. The calcination temperature will depend to some extent on the exact nature of the carbonate moiety but the metastable nature of the precipitate will generally allow the use of comparatively low calcination temperatures in comparison with classic carbonate decomposition. For instance, calcination temperatures as low as 250°–340° C., perhaps even 200° C. are achievable in comparison to the 400°–800° C. required in classic carbonate calcinations. Oxalates and other bicarboxylates may even employ lower calcination temperatures, such as 120° C.

The precipitates formed by the procedures described herein are metastable and therefore prolonged contact with the chemically reactive environment of the mother liquor will tend to cause maturing or ripening. Prior to physical separation of the precipitate, it can be isolated, to some extent, from its chemical environment. For instance, manipulation of the dissolved carbon dioxide concentration can delay ripening in solution, prior to filtration or centrifugal separation. The precipitates are not water sensitive, unlike the prior art zincate precipitation techniques, e.g., of U.S. Pat. No. 5,132,104 which require washing of the separated precipitate in polar organic solvents such as acetone or ethanol.

Suitable separation techniques can include an initial surface charge neutralization step of coating the surface of the precipitate suspension with a surfactant such as methacorylate followed by spray-drying. Calcination of the resultant particles will tend to volatilise any surfactant residues remaining after the spray drying operation.

Spray roasting, in which the precipitate containing solution is sprayed into a heated chamber at temperatures approaching 270° C. can simultaneously effect dewatering and calcination. Filtration, leading to a more densely packed arrangement can also be used, optionally in conjunction with surfactant based redispersion techniques.

The expression 'carbonate source' includes carbonates, bicarbonates, oxalates, malates, succinates and also carbon dioxide introduced into the aqueous solution as a gaseous phase or evolved in situ through dissolution or decomposition. Ammonium salts are preferred especially when the resultant zinc oxide is intended for applications in which metal ion contamination should be avoided, such as electrostatic applications.

Preferred zinc salts to produce the aqueous zinc solution include the nitrate, sulfate and chloride. The solution may be pure water or a mixture of water and another miscible or immiscible solvent such as an alcohol or acetonitrile.

Control of the relative availability of carbonate to zinc ion concentration within the aqueous solution can be simply achieved by the gradual addition of the carbonate source and/or zinc ion, in solid but preferably dissolved form, to the aqueous mother liquor. Alternatively, the reagents can be added in a form which decomposes to release and make available zinc ion or the carbonate source. For example, urea or ammonium carbamate can release carbon dioxide in a retarded fashion to ensure a suitably low reactive concentration. Metal chelators such as the EDTA family can maintain a low reactive zinc ion concentration in the aqueous solution. When carbon dioxide is used as the carbonate source it is convenient to bubble it through the aqueous solution, optionally in conjunction with a solubility regulator such as ammonia.

Control of the pH within the above defined range is advantageously carried out with dilute reagents such as 0.05 to 0.25M KOH or NaOH, in conjunction with vigorous mixing. The preferred DH control agent is ammonium hydroxide, such as a 5–10% ammonia in distilled water solution. The ratio of ammonium to carbonate source will generally be lower, for instance approaching unity compared with prior art methods, which may lead to enhanced metastability in the precipitated complexes.

Appropriate control of the relative availability of the various ions allows control of the aspect ratio of the resultant precipitant. Generally speaking, within the above-defined process conditions, the slower the rate of reactant addition, the greater is the aspect ratio, i.e. the length of the rods. Conversely, increasing the addition rate will decrease the aspect ratio; however, too rapid an addition will lead to the non-homogenous particle size distributions displayed by prior art techniques. Addition rates will vary with the strength and solubility of the reagents, but as a guide, for a 0.5 molar concentration of zinc ion, an addition rate between 0.5 and 2.0 liters/hour for a 0.4 molar equivalent carbonate source has been workable. It should, of course, be recognized that the hydrodynamics of the solution influence the intended morphology. In particular, in contrast to conventional crystal deposition techniques, high aspect ratios will demand effective mixing, even with relatively dilute reagents to avoid localized regions of aberrant reactant concentration.

The actual hydrodynamic conditions employed during precipitation will depend on reactor size, geometry, number of baffles, etc., but generally speaking will be as high as possible without inducing cavitation or other admission of air bubbles into the system. As a guide, a Reynolds number of at least some hundreds, preferably 8000 and above, will be appropriate for many systems.

The procedures described herein allow for doping of the zinc precipitate complex and any zinc oxide end products through co-precipitation of the zinc precipitate with a dopant such as yttrium, aluminum, gallium, platinum, bismuth, a lanthanide, curium, molybdenum, nickel, cobalt, antimony, chromium, or titanium or other group III-VII compounds. Doping can assist the semiconductor, catalytic or photoelectric properties of the particles. Typically 0.01 to 10% of the resultant particles will comprise the dopant oxide.

Co-precipitation can be performed simultaneously with formation of the zinc oxide to produce homogenous particles. The respective concentrations of dopant oxide to zinc oxide in the end product can be controlled through adjustment of their respective reagent concentrations in the mother liquor during precipitation.

Alternatively, doping can be performed sequentially by first forming a zinc carbonate core and then precipitating one or more layers of dopant over the core. The end product powders will than have the dopant on the zinc interface with very little solubility in the solid phase.

Doped particles of controlled size and morphology have many uses in the electronic and electroconductive fields. Populations of the particles, as spheres which are then fused into rods, or as rods, can be tailored for specific roles, as described herein.

An electroconductive composition may comprise a polymer substrate or base having the particles incorporated therein, typically in an amount corresponding to 0.01 to 25 wt%. Higher aspect ratios are generally preferred to enhance interparticle contact and thereby electrical conductivity. The elongate shape and ultrafine size of the present particles leads to good dispersability of the particles within the substrate allowing smaller quantities of the particles to be used in comparison to prior art electroconductive compositions.

The particles used in these electroconductive roles are preferably those produced by coprecipitation of the dopant metal, but may also be formed from the earlier-described controlled morphology particles which have been surface doped by conventional techniques.

Preparation of Zinc Oxide Spheres

Zinc oxide spheres are prepared and then fused into a rod shape zinc oxide particle, as described below.

Referring initially to FIG. 1, this procedure includes the steps of forming an aqueous solution of a zinc ion, followed by pH and temperature adjustment. A gaseous carbon dioxide stream is introduced to the zinc solution while a pH and temperature feedback loop maintains precise control over the reaction environment. A precipitate comprising a mixed complex of zinc and hydroxide, bicarbonate and carbonate forms as the carbon dioxide is fed in. The metastable precipitate is separated from the mother liquor which is temperature treated to reform the reagents. The precipitate can be low temperature calcined to form an ultrafine ZnO powder of defined particle size and morphology to form a mixed complex of zinc and hydroxides, bicarbonates and carbonate.

In this procedure, the reactor comprises a 2 liter cylinder equipped with vertically extending baffles around its circumference. Stirring was achieved with a central impeller which was speed governed to within 1% of the nominal rpm. Reagent addition to the reactor was via glass conduits opening into the reactor adjacent the impeller, thereby assuring instant mixing. Gaseous reagents were added via microporous sintered glass tips again adjacent the impeller.

A central microprocessor received input form pH, temperature and ion-selective probes mounted in the reactor and controlled peristaltic reagent input pumps and high precision reagent input valves. Bulk reagent vessels were equilibrated to the intended reaction temperature.

68.14 g of 99.81% pure ZnCl (Sigma Chemical Co., St. Louis, Mo.; Alcrich Chemical Co., Milwaukee, Wis.) was dissolved in 1.5 liters of distilled water and fed into the reactor. The temperature was reduced to 22° C. and maintained within a degree of this temperature, throughout the experiment. Stirring was set to 175 rpm. The pH was controlled with an ammonium solution comprising 8% ammonia in distilled water which was very gradually added to the stirred solution so as to avoid localized pH perturbation. The pH was maintained in this fashion within the range 9.5–10 throughout the experiment.

A carbonate source comprising carbon dioxide gas 0.1% (balance oxygen and nitrogen) was introduced to the solution at approximately 4.0 l/h. The precipitate formed instantly and the carbon dioxide inflow was continued until an appreciable amount of precipitate was dispersed in the reactor.

The precipitate was washed in distilled water and dried. The powder was X-ray amorphous. The powder was calcined at 270° C. for 3 hours to form a white powder of submicron particles with a narrow size distribution and with a density of around 5.6 g/cm and surface area of 35 m/g.

Figure 2:
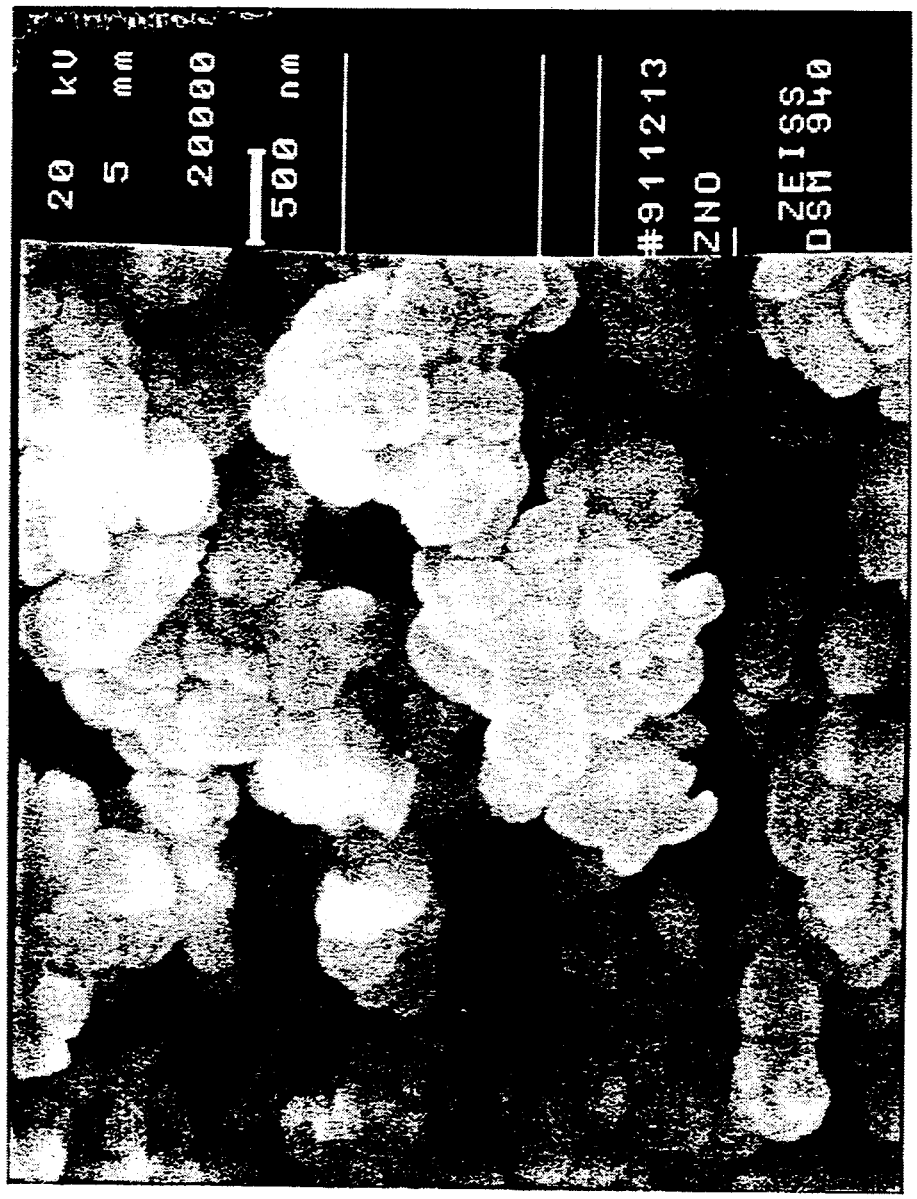
FIG. 2 is a scanning electron micrograph of spherically shaped zinc oxide particles.

The powder was prepared for scanning electron microscopy by the gold coating method. As can be seen from the micrograph of FIG. 2, these process conditions produced a sphere morphology with a diameter between 50 and 150 nm.

Referring once again to FIG. 1, process refinements can include the recycling of the ammonia component, heat separated from the mother liquor after removal of the precipitate, back to the pH adjustment step, marked with the letter A in FIG. 1. Additionally or alternatively, the liquid from this ammonia recovery step can be treated to recover the solvent which can also be recycled to provide a virtually closed environmentally friendly system ("B" in FIG. 1).

Preparation of Shorter Zinc Oxide Rods

The apparatus described above was charged with 1.5 l of distilled water. Stirring, temperature and pH control were also as above.

Aqueous 0.3M zinc chloride and 0.2M ammonium bicarbonate solutions were simultaneously added to the reactor via separate conduits at a respective rate of 0.5 l/h and 0.5 l/h. The resultant precipitate was separated as above.

Figure 3:
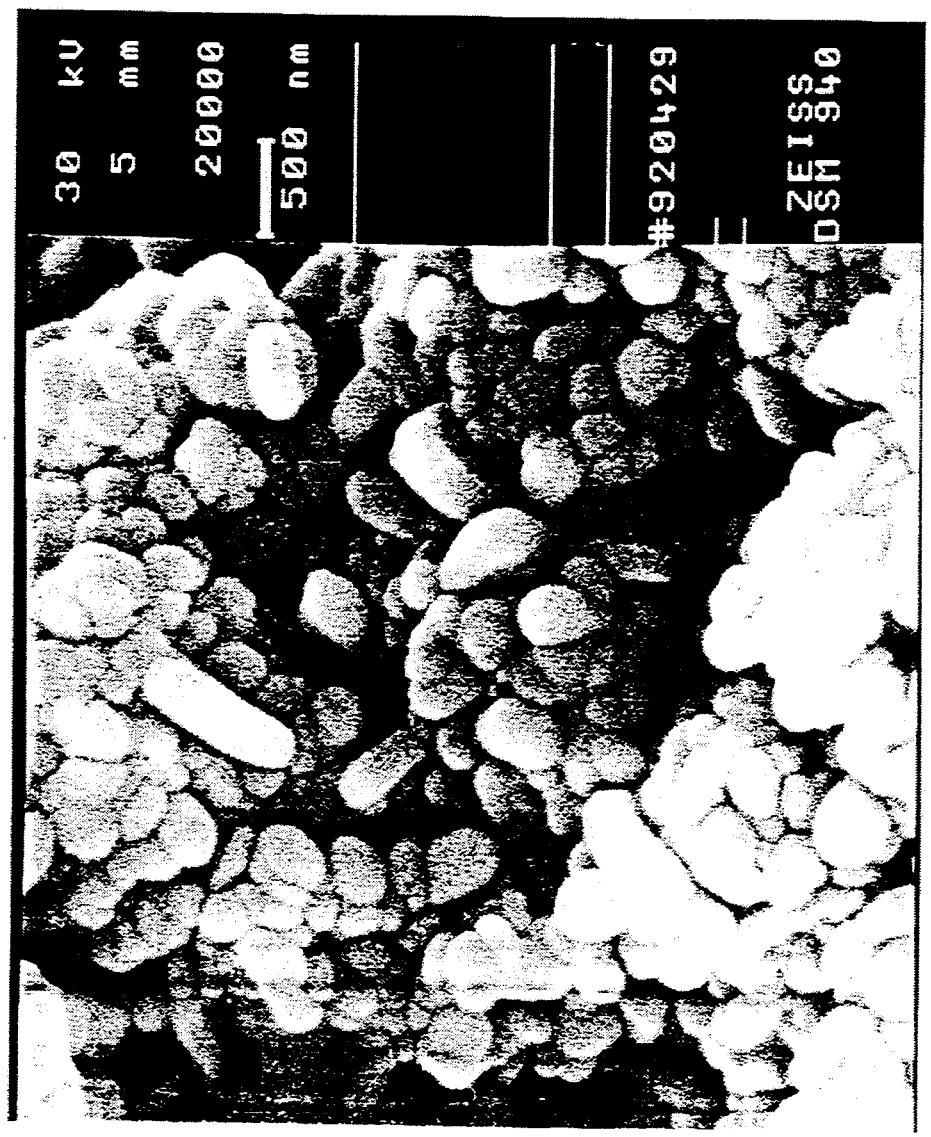
FIG. 3 is a scanning electron micrograph of rod shaped zinc oxide particles.

Calcination of the resultant precipitate was at 250° C. for 3 hours. FIG. 3 shows the resultant zinc oxide particles which display a rod morphology with diameters between 50 to 100 nm and lengths between 100 to 200 nm.

When carbon dioxide is used as the precipitant, an additional recycling possibility is to collect carbon dioxide from the calcination step for use as the precipitant, as shown with dotted lines on FIG. 1.

Preparation of Longer Zinc Oxide Rods

In the system described for the preparation of zinc oxide rods, but with a stirring speed of 200 to 250 rpm, 0.3M zinc chloride and 0.1M carbamate ($NH_2CO_2NH_4$) solutions were simultaneously added to the reactor through respective glass conduits at respective addition rates of 0.5 and 0.7 l/h. Carbamate is stable in solution but breaks down via metal catalysis to liberate reactively available carbon dioxide and ammonia in solution.

Figure 4:
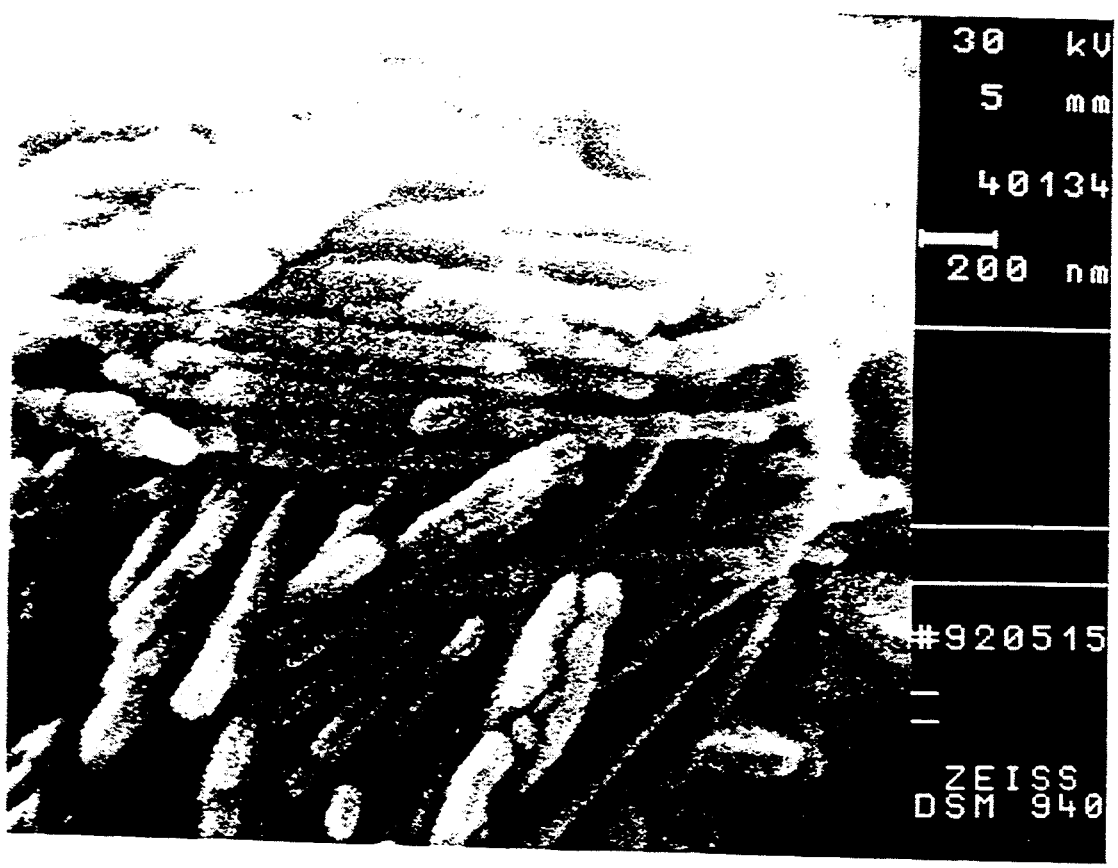
FIG. 4 is a scanning electron micrograph of fiber shaped zinc oxide particles.

The resultant precipitate was separated and prepared for SEM as above. These process conditions produced a longer rod shaped morphology, as shown in the micrograph in FIG. 4. The rods display an homogenous size distribution between 10 to 50 nm in diameter and 50 to 500 nm in length.

Preparation of Zinc Oxide via Oxalate Route

In the reactor conditions described in preparation of zinc oxide rods, above, but with the stirring speed within 150 to 175 rpm, 0.2M zinc chloride and 0.1M oxalic acid were simultaneously added to the reactor at respective rates 0.5 and 0.8 l/h. The precipitate was recovered as described in the rod preparation above, but at a calcination temperature of 125° C. Electron microscopy of the resultant powder showed spherical particles with diameters within the range 50 to 150 nm. Rod morphologies can also be deposited using this reagent system.

Preparation of Doped Zinc Oxide Particles

Figure 5:
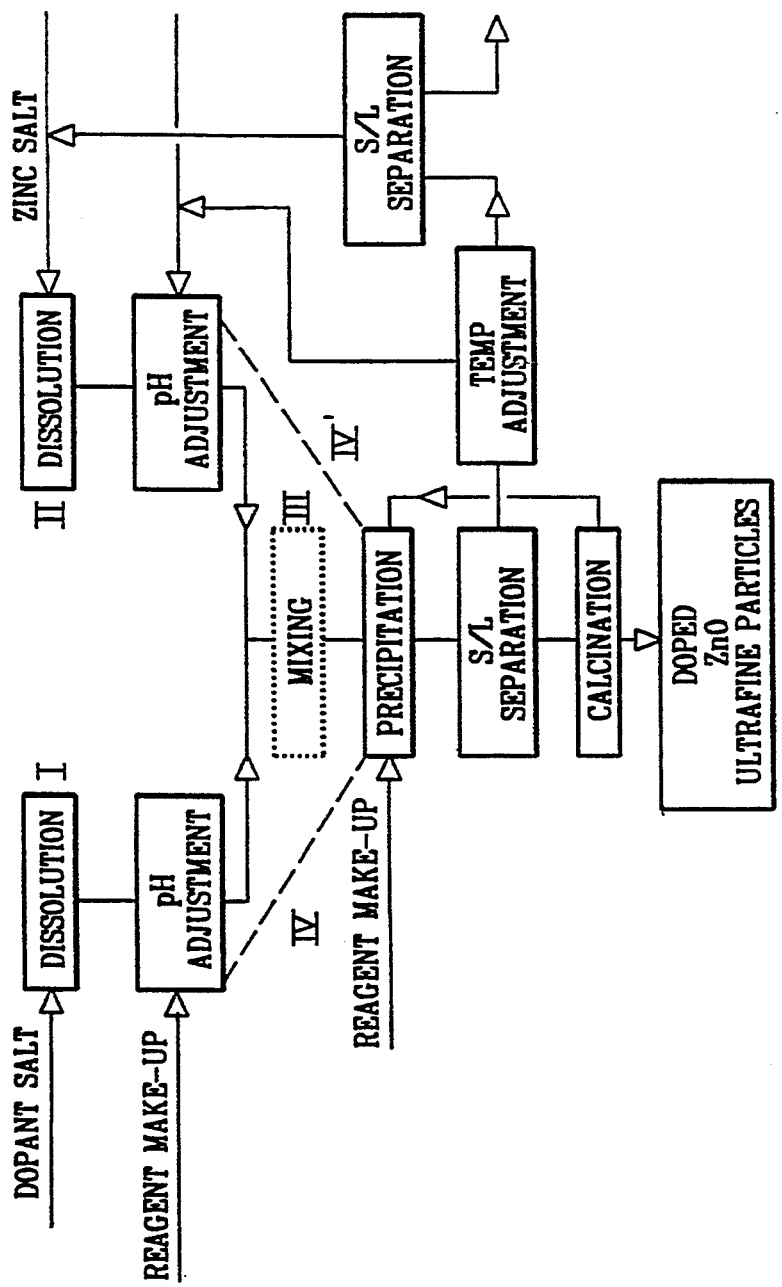
FIG. 5 is a flow diagram of a second process for producing zinc oxide particles as described herein.

Referring now to FIG. 5, a scheme for the production of doped zinc oxide particles is shown. In this scheme, two separate metal solutions, the first a zinc ion solution (I, at the top, left) and the second a dopant metal ion solution (II, top, right) are prepared and separately pH and temperature adjusted.

In a first process variant leading to an homogenous dopant/zinc precipitate, the respective metal ion solutions are mixed (III) and introduced to the mother liquor together. In this fashion, the resultant precipitate complex comprises an intimate coprecipitate of dopant and zinc, the proportion of Bach reflecting their respective concentrations in the mixed input stream. As with the earlier described procedures, pH and temperature feedback loops (IV, IV') can be provided to maintain optional reaction conditions during the precipitation, in particular when it is desired to take account of the differing solubilities of zinc and dopant metal ions at different pHs to assist in regulating proportionality of deposition of the respective metals.

In a second process variant the mixing of metal ion solutions I and II is avoided and the respective solutions are admitted to the reactor sequentially. The resultant precipitate comprises an initially precipitated zinc complex core surrounded by a layer of dopant ion complex. Again, the pH control of the respective metal solutions may take advantage of the differing solubilities of the respective metals at different temperatures.

In each case, the respective precipitates are separated and calcined in similar fashion to the above described procedures to produce doped ZnO particles of defined size and morphology.

Preparation of Zn/Bi Coprecipitate

A first process variant of the preparation of doped zinc oxide particles was used to produce a mixed coprecipitate of metastable Zn and Bi carbonates.

The reactor system described above in the preparation of zinc oxide particles, as shown in FIGS. 1 and 5, was charged with distilled water and the pH initially adjusted to 8-11 with dilute ammonia solution. A first solution was prepared by mixing 0.3M $ZnCl_2$ and 0.01M $Bi(NO_3)_3$ in the ratio 3:1, the ratio being adjusted with reference to the desired composition of the end product oxide. A second solution comprised 0.1M $NH_4HCO_3$.

The first and second solutions were added dropwise to the aqueous system and the pH carefully maintained at the initial value by dropwise addition of the dilute ammonia solution during vigourous agitation. A composite consisting essentially of metastable zinc and bismuth carbonates was coprecipititated and calcined to obtain a very homogenous mixture of ZnO and $Bi_2O_3$ having the above defined particle size and distribution.

A variant of this process uses a dual dopant oxide solution, in particular with a solution of Bi and Sb to produce a trimetal coprecipitate.

Preparation of ZnO/$Al_2O_3$ Coprecipitate

A second process variant of FIG. 5 was used to produce a coprecipitate of ZnO and $Al_2O_3$ suitable for electronic applications.

The water charged reactor system described in the above description of the preparation of zinc oxide particles was pH adjusted to between 8 and 10. With reference to FIG. 5, a zinc core precipitate was first produced by dropwise addition of a solution II consisting of 0.3M $ZnCl_2$ and a separate carbonate source solution comprising 0.1M $NH_4HCO_3$. The pH was controlled via the feedback loop with small additions of dilute ammonia to the vigourously agitated aqueous solution.

Referring again to FIG. 5, solution I comprised 0.1M $AlNO_3$ which was subsequently precipitated onto the suspended zinc precipitate core. Calcination of the mixed precipitate provided a uniform powder of biphase aluminium oxide on zinc oxide appropriate for semiconducting roles, for example, conventional compression sintering to form varistors.

This reagent system can also be used in the process variant of the Zn/Bi coprecipitate preparation described above, for example, at a 5:1 ratio of the Zn:Al solutions to form a homogenous coprecipitate.

The zinc oxide rods described herein may be combined with any fiber-forming polymer to produce a conductive fiber as described herein. A metastable zinc ion precipitate, as described above, is combinable with the polymer in a manufacturing process, examples of which are described below.

Preparation of Conductive Fibers

Conductive fibers of the invention may be prepared as follows.

Figure 6:
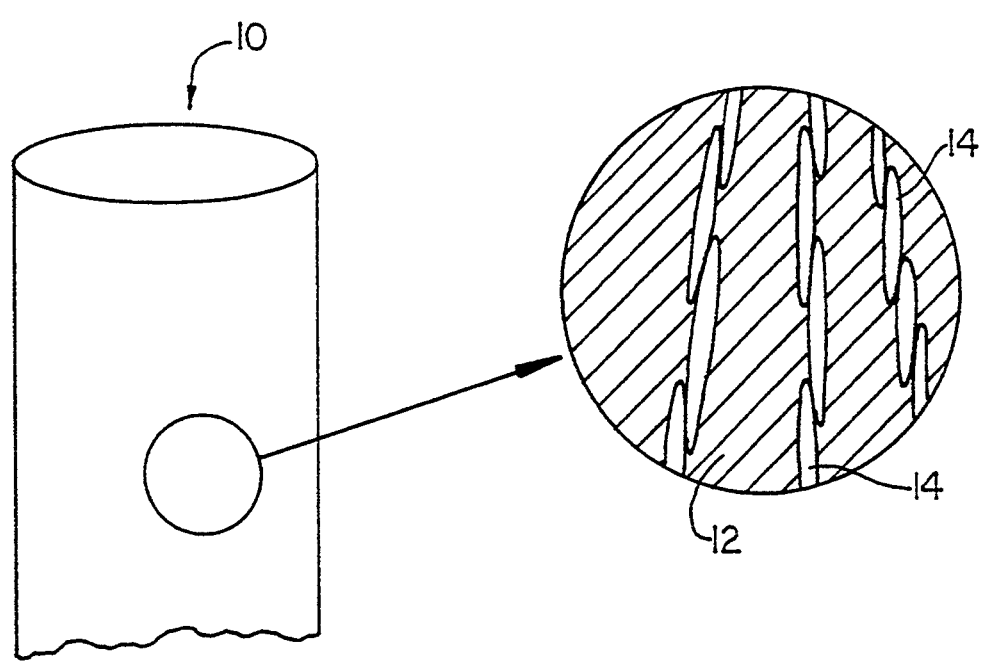
FIG. 6 is a schematic drawing of a conductive fiber of the invention.

Conductive composite fibers of the invention include a conductive component containing conductive zinc oxide particles and a non-conductive component bonded thereto. The non-conductive component protects the conductive component and confers strength to the fibers. Conductive fibers which are not composite, but contain a fibrous component which is itself conductive are made also as described below, but contain polymers which are fiber-forming and are able to bind zinc oxide. These fiber forming polymers are combined with zinc oxide particles, as described below, but do not need an additional non-conductive component. FIG. 6 shows a conductive fiber 10 containing a fiber-forming polymer 12 and zinc oxide rod-shaped particles 14.

Polymers which can be provided in a fibrous form and can bind conductive zinc oxide particles include but are not limited to the following: thermoplastic polymers, for example, polyamides, such as nylon-6, nylon-11, nylon-12, nylon-66, nylon-610, nylon-612, etc., polyesters, such as polyethylene terephthalate, polybutylene terephthalate, polyethylene oxbenzoate, etc., polyolefins, such as polyethylene, polypropylene, etc., polyethers, such as polymethylene oxide, polyethylene oxide, polybutylene oxide, etc., vinyl polymers, such as polyvinyl chloride, polyvinylidene chloride, polystyrene, etc., polycarbonates, and copolymers and mixtures consisting mainly of these polymers. The solvent-soluble-polymers include acrylic polymers containing at least 85% by weight of acrylonitrile, modacrylic polymers containing 35-85% by weight of acrylonitrile, cellulose polymers, such as cellulose, cellulose acetate, vinyl alcohol polymers, such as polyvinyl alcohol and saponified products thereof, and polyurethane, polyurea, and copolymers or mixtures consisting mainly of these polymers. As these polymers, polymers having low fiber-forming ability also may be used but polymers having fiber-forming ability are preferable. Fibers useful in the invention also include natural fibers, such as cotton or wool.

Fiber-forming polymers useful in the invention may be made of polymers capable of being melt spun, dry spun and wet spun, for example, among the above-described thermoplastic polymers and solvent soluble polymers, fiber-forming polymers may be used. Among the fiber-forming polymers, polyamides, polyesters and acrylic polymers are preferable. To the fiber-forming polymers may be added various additives, such as delusterants, pigments, coloring agents, stabilizers, antistatic agents (polyalkylene oxides, various surfactants).

The mixed ratio of the conductive zinc oxide rods in the conductive component varies depending upon the conductivity, purity, structure, particle size, chain forming ability of particle, and the property, kind and crystallinity of the polymer but is generally within a range of 25–85% (by weight), preferably 40–50%. When the mixed ratio exceeds 80%, the fluidity is deficient and a fluidity improving agent (low viscosity substance) is needed.

In addition to the conductive zinc oxide rod particles, other conductive particles may be used together with the zinc oxide particles in order to improve the dispersability, conductivity and spinability of the particles. For example, titanium, tin, copper, silver, nickel, iron, aluminum and other metal particles may be mixed with the zinc oxide component. In the case of use of these particles, the mixed ratio of the conductive metal oxide particles may be smaller than the above described range but the main component (not less than 50%) of the conductive particles is the conductive zinc oxide rod particles.

If desired, a dispersant may be added to the conductive component. Suitable dispersants include wax, polyalkylene oxides, various surfactants, organic electrolytes, etc. Other agents may also be added to confer other desired properties; for example, a coloring agent, a pigment, a stabilizer (antioxidant, a ultraviolet ray absorbing agent, etc.), or a low viscosity substance which acts as a fluidity improving agent.

The conjugate-spinning (bonding) of the conductive component and the non-conductive component may be carried out in any manner known in the art.

Sheath-core type composite fibers wherein the conductive component is the core are well known in the art. In the sheath core type of composite fibers, the non-conductive component protects the conductive component. However, because the conductive component is not exposed to the surface, the antistatic property may be reduced.

Side-by-side type composite fibers are also well known in the art. Because the conductive component is exposed to the surface, the antistatic property is excellent, although there is little protection of the conductive component by the non-conductive component. U.S. Pat. Nos. 4,420,534 and 4,475,873, hereby incorporated by reference, describe composite fibers in general and preferred fibers in which the conductive component is inserted in thin layer form or is mostly surrounded by the non-conductive component.

The area ratio, that is the conjugate ratio occupied by the conductive component in the cross-section of the composite filaments is preferably 1–80%, and most preferably 3–60%.

The conductive component using the conductive zinc oxide rods contains a smaller proportion of conductive particles within the fiber compared to non-rod-shaped particles. Consequently, the content of the polymer used as the binder is increased relative to fibers containing non-rod-shaped metal oxide particles, and thus the mechanical strength of the formed composite fibers is better and more flexible. The brittle quality of composite fibers containing non-rod-shape zinc oxides is not found in the fibers of the invention. There is no concern when using rod-shaped zinc oxide particles to prepare fibers according to the invention that the conductive component will be broken due to drawing and friction, or that conductivity will be lost during the drawing process due to breakage. Conductive composite filaments of the invention can be produced by a usual melt, wet or dry conjugate-spinning process. For example, in melt spinning, a first component composed of a fiber-forming polymer and if necessary, an additive, such as antioxidant, fluidity improving agent, dispersant, pigment and the like and second component (conductive component) composed of a conductive zinc oxide rod particles, a binder of a thermoplastic polymer and if necessary, an additive are separately melted and fed while being metered in accordance with the conjugate ratio. The components are then bonded in a spinneret or immediately after spinning through spinning orifices, cooled and wound up, and if necessary drawn and/or heat-treated.

In wet spinning, a first component solution containing a solvent-soluble fiber-forming polymer and if necessary an additive and a second conductive component solution dissolving conductive zinc oxide rod particles, a solvent soluble polymer as a binder and if necessary an additive in a solvent are fed while being metered in accordance with the conjugate ratio, bonded in a spinneret, or immediately after spinning through spinning orifices, coagulated in a coagulation bath, wound up, if necessary washed with water, and drawn and/or heat-treated, In dry spinning, both the component solutions are spun, for example, into a gas within a spinning tube instead of the coagulation bath used in wet spinning, if necessary heated to evaporate and remove the solvent, and wound up, if necessary, washed with water, drawn and/or heat-treated.

In the following methods for manufacture of conductive fibers, there is relatively little decrease in conductivity during the drawing step in comparison to drawing of fibers containing non-rod-shaped particles due to the tendency for the rod-shaped zinc oxide particles to lie side-by-side and maintain contact.

The size of the zinc oxide rod-shaped particles useful in manufacturing fibers for textiles is as follows. The smaller rods, i.e., less than 300 nm length and 150 nm diameter, potentially provide higher conductivity per unit weight by virtue of the greater area for inter-particle contact. Longer rods, i.e., more than 300 nm length and 150 nm diameter, which provide less conductivity than the shorter rods, may nevertheless be good for the antistatic uses described herein.

In general, highly crystalline polymers are desired to form the polymer which binds the zinc oxide particles. The crystallinity (by density method) is preferred to be not less than 40%, particularly not less than 50%, more particularly not less than 60%.

A decrease in the conductivity due to drawing can be avoided by applying heat during the drawing step. The temperature may be fine-tuned by maintaining the drawing temperature or the temperature of heat-treatment after drawing to near the softening point or melting point of the zinc binding polymer or higher than the melting point of the zinc binding polymer.

In order to practically carry out this method, the non-conductive component, that is the protective layer of the composite filaments, must have a sufficiently higher softening point or melting point than the drawing or heat-treating temperature. That is, the fiber-forming polymers, which are the non-conductive component, are preferred to have a higher softening point or melting point than the thermoplastic polymers or solvent soluble polymers which form the conductive layer.

The textile may be produced using conductive composite filaments having a low orientation, i.e., using undrawn or semi-drawn (half oriented) conductive composite filaments. It is relatively easy to produce undrawn yarns having excellent conductivity by using composite filaments composed of a conductive component containing the conductive metal oxide particles and a non-conductive component. Particularly useful draw ratios for producing conductive yarns are not more than 2.5 draw ratio, and not more than 89% of orientation degree.

Manufacture of Conductive Textiles

A conductive textile of the invention may be produced by melt-conjugate-spinning nylon-112 a non-conductive component and a mixture of 75% of conductive zinc oxide particles having a grain size of 0.25 $\mu$m, 24.5% of nylon-12 and 0.5% of magnesium stearate (dispersant) as a conductive component at a usual spinning velocity. The antistatic property may be evaluated by assessing the charged voltage due to friction of knitted goods wherein the above described composite filaments are mixed in a ratio of about 1% in a knitted good made of nylon-6 drawn yarns in an interval of about 6 mm. Generally, as the draw ratio increases, the specific resistance increases sharply; however, at a draw ratio of not less than 2.0, the increase becomes gradual. On the other hand, the charged voltage is substantially constant at a draw ratio of not more than 2.5 and suddenly increases at a draw ratio of more than 2.5, whereat the antistatic property is lost. At a specific resistance of not less than $10^8\omega$-cm, there is no antistatic property and at a specific resistance of not more than $10^7$ $\Omega$-cm, the antistatic property is satisfactorily realized. The draw ratio and orientation varies depending upon the properties of the conductive particles and the particle binding polymers; in most cases, the draw ratio is 2.0-2.5 and the orientation degree is 70-89%.

Yarns having a low orientation, that is undrawn or semi-drawn yarns of the conductive composite filaments, may be directly used for production of the final fibrous product. But, when the undrawn or semi-drawn yarns are subjected to external force, particularly tension in the production steps of fibrous particles, for example, knitting or weaving steps and the like, there is fear that the conductive composite filaments will be drawn and the conductivity will be lost. Therefore, it is desirable that the conductive composite filaments having a low orientation (with an orientation degree of less than 89%) are doubled, or doubled and twisted with non-conductive fibers having a high orientation, as described below. The resulting yarns are then preferably used in the steps for producing knitted or woven fabrics and other fibrous articles.

Each of the polymers for forming conductive composite filaments having a low orientation and nonconductive fibers having a high orientation (orientation degree, not less than 85%, particularly not less than 90%) may be optionally selected. However, in view of the heat resistance and dye affinity, it is most preferable that these polymers be the same or of the same kind. For example, all the non-conductive component (protective) polymer (1), the conductive component (binder) polymer (2) of the conductive composite filaments and the polymer (3) of the non-conductive fibers having high orientation may be polyamides, and this is preferable. Similarly, all the above described three polymers may be a polyesters, polyacrylic polymers or polyolefins and these polymers are preferable.

The doubling may be carried out by any known method. It is preferable to integrate both the components by a proper means so as not to separate both the components. For example, twisting, entangling by means of an air jet and bonding using an adhesive are useful. The twist number is preferably less than 10 T/m, particularly 20-500 T/m. The twist number is preferably not less than 10/m, particularly 20-100/m. As to the bonding method, yarns may be treated with an aqueous solution, an aqueous dispersion or a solvent solution of polyacrylic acid, polymethacrylic acid, polyvinyl alcohol, polyvinyl acetate, polyalkylene glycol, starch, dextrine, arginic acid or derivatives of these compounds.

The ratio of doubling may be optional. The mixed ratio of the conductive composite filaments in the doubled yarns is preferred to be 1-75% by weight, particularly 3-50% and the fineness of the doubled yarns is preferred to be 10-1,000 deniers, particularly 20-500 deniers for knitted or woven fabrics.

The composite filaments may be taken up while orienting them moderately or highly upon spinning. In this case, the obtained filaments can be used without affecting the drawing (draw ratio 1) or can be used for production of fibrous articles after drawing in a draw ratio of not more than 2.4. It is necessary to give a satisfactory orientation degree to the composite filaments upon spinning so as to provide the satisfactory strength of more than 1 g/d, particularly more than 3 g/d in a draw ratio of 1-2.5. The orientation degree of the usual melt spun undrawn filaments is not more than about 70%, in many cases not more than about 60%. However, in order to attaining the above described object, the orientation degree of the spun filaments (undrawn) is preferred to be not less than 70%, particularly not less than 80%. The filaments having an orientation degree of not less than 90%, particularly not less than 91% are highly oriented filaments and drawing is often not necessary, The orientation degree of the spun filaments may be increased upon spinning by applying a higher shear stress while the spun filaments are being deformed (fining) in fluid state prior to solidification. For example, the velocity for taking up the spun filaments is increased, the viscosity of the spinning solution is increased, or the spinning deformation ratio (fining ratio) is increased. The method for increasing the viscosity of the spinning solution comprises increasing the molecular weight of the polymer, increasing the concentration of the polymer (dry or wet spinning) or lowering the spinning temperature (melt spinning).

The shearing stress applied to the spun fibers can be evaluated by measuring the tension of the filament during spinning. In the case of melt spinning, the tension of the spinning filament in usual spinning is not more than 0.05 g/d, particularly not more than 0.02 g/d, but moderately or highly oriented filaments can be obtained by making the tension not less than 0.05 g/d.

Generally, conductive textiles may be made using conductive fibers produced according to the methods (a)–(c) described below. Of course, the invention is broad enough to encompass other methods for producing fibers and is thus not limited to (a)–(c) below.

(a) Conductive composite filaments of the invention may be produced by conjugate-spinning, e.g., a nonconductive component composed of a fiber-forming polymer and a conductive component composed of a thermoplastic polymer with and conductive zinc oxide rod shaped particles. The thermoplastic polymer preferably has a melting point which is lower by at least 30° C. than the melting point of the non-conductive component. The spun composite filaments are heat treated at a temperature which is not lower than the melting point of the above described thermoplastic polymer and which is lower than the melting point of the above described fiber-forming polymer, during or after drawing, or during drawing and successively.

In method (a), the heat treatment is effective at a temperature between the melting point of the polymer of the binder in the conductive component and the melting point of the polymer of the non-conductive component. In order to actually carry out the heat treatment effectively, the melting points of both the components must differ by at least 30° C. If the difference between the melting points is less than 30° C., it is difficult to selected the pertinent heat treating temperature and there is a great possibility that the strength of the non-conductive component will be deteriorated by the heat treatment. Therefore, the difference between the melting points is preferably not less than 50° C., most preferably not less than 80° C. For example, the non-conductive component polymer may have a melting point of not lower than 150° C., and the conductive component polymer may have a melting point, which is more than 30° C. lower than the melting point of the non-conductive component polymer; for example, a polymer having a melting point of 50°–220° C. The non-conductive and conductive component polymers are combined and conjugate spun at a temperature between the melting points of both the polymers, e.g., 50°–260° C., or 80°–200° C., and then the drawing is effected.

The heat treatment can be carried out after drawing of the composite filaments. That is, the conductive structure broken by the drawing can be again grown by heating and cooling to recover the conductivity. For example, the drawn filaments are heated under tension or relaxation at a temperature which is higher than the melting point or softening point of the conductive component polymer and is lower than the melting point or softening point of the non-conductive component polymer, and then cooled, whereby the conductive structure can be again grown. In this case, the difference of the melting point or softening point of both the polymers is preferred to be within the above described ranged and it is desirable that the difference is greater than 30° C., particularly greater than 50° C. Since the polymers should not be solidified (crystallized) at a temperature at which the fibers are used, the melting point of the polymers having a low melting point is preferred to be higher than 40° C., particularly higher than 80° C., more particularly higher than 100° C. The temperature of the heating treatment is preferable 50°–260° C., particularly 80°–240° C. In general, it is frequently difficult to draw undrawn filaments at too high a temperature (not lower than 150° C., particularly not lower than 200° C.), so that the heat treating process after drawing is more broadly used than the above described hot drawing process. In reality, it is most effective to combine the hot drawing and the heat treatment after drawing. Furthermore, it is highly practical that the drawing is carried out at a temperature of about 40°–120° C., and only the heat treatment after drawing is carried out at a temperature between the melting points of the polymer.

The heat treatment after drawing may be carried out under dry heat or wet heat under tension or relaxation. Of course, it is possible to continuously carry out the heat treatment while running the filaments or to carry out batch treatment of yarns wound on a bobbin or staples. In addition, the above described recovery of the conductivity can be carried out in the steps of dying or finishing yarns, knitted goods, woven or unwoven fabrics, carpets and the like.

In general, the recovery of the conductivity owing to the heat treatment is often more effective in a shrinking (relaxing) treatment than in a stretching treatment. Of course, the shrinking treatment is apt to decrease the strength of the fibers, so that it is necessary to select proper heat treating conditions while taking this point into consideration.

(b) Method (b) of the invention comprises dry spinning the spinning solutions by dissolving the conductive component and the non-conductive component respectively in solvents or wet spinning these solutions into a coagulation bath. Conductive composite filaments of the invention thus may also be produced by conjugate-spinning a solution of a nonconductive component comprised of at least one polymer selected from the group consisting of acrylic polymers, modacrylic polymers, cellulosic polymers, polyvinyl alcohols and polyurethanes in a solvent and a solution of a conductive component comprised of a solvent soluble polymer and conductive zinc oxide rod-shaped particles in a solvent, drawing the spun filaments and heat treating the drawn filaments. For example, in the case of acrylic polymer, an organic solvent, such a dimethylformamide, diethylacetamide, dimethylsulfoide, acetone, etc. or an inorganic solvent, such as aqueous solution of the rhodonate, zinc chloride or nitric acid is used. The spun filaments are heat treated after drawing.

Heat treatment as described in the method (a) above can be applied during the drawing step or the heat treatment after drawing step during production of the composite filaments obtained by the wet spinning or dry spinning. The drawing temperature is preferred to be not lower than 80° C., particularly 100°–130° C. in wet heat and is preferred to be not lower than 80° C., particularly 100°–200° C. in dry heat. Heat treatment after drawing is substantially the same. The heat after-treatment can be carried out a plurality of times under tension of relaxation, or under the combination thereof. In view of the conductivity, particularly the recovery of the conductivity deteriorated or lost by the drawing, the shrinking heat treatment is preferable, although it is desirable to carry out this treatment taking into account the concomitant reduction in strength.

In wet or dry spinning, the spinning material is dissolved in a solvent and then used.

Even when a large amount of conductive zinc oxide rods are mixed in the polymer, the fluidity can be improved by diluting the mixture with a solvent, so that the method may be more advantageous than the melt spinning. However, in order to improve the homogeneity, fluidity and coagulating ability of the spinning solution mixture, a variety of additives and stabilizers may be added, for example, a pigment, a stabilizer or other additives.

(c) Other conductive composite filaments of the invention may be produced by melting a non-conductive component composed of a fiber-forming polymer and a conductive component composed of a thermoplastic polymer and conductive zinc oxide rod particles respectively, conjugate-spinning the molten components at a taking up velocity of not less than 1,500 mi/min, particularly not less than 2,000 m/min and, if necessary, drawing the spun filaments at a draw ratio of not more than 2.5. In this method, even in the undrawn state or at the draw ratio of not more than 2.5, particularly not more than 2, conductive composite fibers having satisfactorily practically endurable strength, for example, not less than 2 g/d, particularly not less than 3 g/d can be obtained.

In order to obtain strong fibers, the spinning velocity must be not less than 1,500 m/min, preferably 2,000–5,000 m/min, particularly 2,000–5,000 m/min, fibers having a fairly high orientation degree can be obtained and, using a draw ratio of 1.1–2.5, particularly 1.2–2, satisfactory fiber strengths can be obtained. With a spinning velocity of 5,000–10,000 m/min, satisfactory strength can be obtained in a draw ratio of not more than 1.5, and the fibers can be used even in the undrawing.

The fibers spun at a high spinning velocity are, if necessary, drawn and/or heat treated. In the drawing, the reduction of the conductivity is generally smaller in the hot drawing than the cold drawing. The temperature of the hot drawing is preferred to be 50°–200° C., particularly 80°–180° C. The heat treatment of the drawn fibers or undrawn fibers is carried out at substantially the same temperature under tension or relaxation, whereby the strength, heat shrinkability and conductivity of the fibers can be improved.

Conductive composite filaments of the invention have excellent conductivity, antistatic property and transparency, if desired.

The conductive composite filaments of the present invention can provide the antistatic property to the fibrous articles by being mixed with other natural fibers or artificial fibers having the electric charging property in continuous filament form, staple form, non-crimped form, crimped form, undrawn form or drawn form. The usual mixed ratio is about 0.1-10% by weight of the composite filament but of course, the mixed ratio of 10–100% by weight or less than 0.1% by weight is applicable. The mixing may be effected by blending, doubling, doubling and twisting, mix spinning, mix weaving, mix knitting and any other process.

The crystallinity of polymers is determined by measuring the crystallinity when the sample polymer is spun, drawn and heat treated under approximately the same conditions as in the production of the conductive composite filaments. There are a variety of methods well known in the art for measuring the crystallinity by the crystallinity.

Preparation of Conductive Carpet

Zinc oxide rod-shaped particles having an aspect ratio of at least two, an average length of 100 nm and an average diameter of 50 nm, were prepared as described above.

The zinc oxide rods were kneaded together with each of the following polymers to produce yarn for use in manufacturing a conductive carpet having antistatic properties: 1) low density polyethylene, 50,000 mw, melting point 102° C., crystallinity 37%; 2) high density polyethylene, 48,000 mw, melting point 130° C., crystallinity 77%; 3) polyethylene oxide, 63,000 mw, melting point 55° C., crystallinity 85%; 4) polyetherester, 75,000 mw, which is a viscous liquid (0% crystallinity) at room temperature and has been produced by copolymerizing 90 parts of a random copolymer consisting of 90 parts of a random copolymer consisting of 75 parts of ethylene oxide unit and 25 parts of propylene oxide unit and having a mw of 20,000 with 10 parts bishydroxethyl terephthalate in the presence of a catalyst of antimony trioxide (600 ppm) at 245° C. for 6 hours under a reduced pressure of 0.5 Torr; and 5) nylon-6, 16,000 mw, melting point 220° C., crystallinity 45%.

Once kneaded, the zinc oxide rods and the polymer formed a conductive mixture comprising 60-75% polymer. Each mixture may be used as a conductive core or sheath component. The conductive core and/or sheath components may be conjugate spun into a composite fiber having a conjugate ratio of 1/10 (cross-sectional area ratio) through orifices having a diameter of 0.3 mm, maintained at 270° C. The extruded fibers are taken up on a bobbin at a rate of 1000 m/min. while cooling and oiling, and the taken-up fibers are drawn to 3.1 times their original length on a draw pin kept at 80° C. to obtain drawn composite fiber yarns of 20 deniers/3 fibers. The resulting yarns may be of any desired color, as the zinc oxide rods are transparent, depending upon the dye or pigment which is included in the fiber-forming process.

Each of the yarns may be doubled with crimped mylon-6 yarn (2600d/140f), and the doubled yarn subjected to a crimping treatment. A tufted carpet (loop) is thus produced using the doubled yarn in one course, our of four courses, and the nylon-6 crimped yarn (2600d/140f) in other three courses.

The conductive carpet can be tested for its antistatic properties as follows. A person wearing leather shoes will walk across the carpet (25° C., 20% RH). The charged voltage generated by this action on the human body is then measured. In general, yarns having a resistance of higher than $10^{13}$ ohm.cm are insufficient as a conductive yarn, and yarns having a resistance of not higher than $10^{12}$ ohm.cm, particularly not higher than $10^{11}$ ohm.cm are preferred.

Other Embodiments

Other conductive textiles may be manufactured from conductive fibers containing zinc oxide rod-shaped particles, the fibers and the rods of which can be made as described in detail herein, including but not limited to upholstery, garments and articles of clothing, blankets, draperies, ropes, hairbrushes, and wigs. Manufacturing processes for the production of such textiles are well known in the art and need not be described in detail herein for a person of skill in the art to produce such items using the zinc oxide rod shaped particles described herein.

While the invention has been described in detail and with reference to specific embodiments thereof, it will be apparent to one skilled in the art that various changes and modifications can be made therein without departing from the spirit and scope thereof.

We claim:

1. A conductive fiber comprising a fiber-forming polymer in combination with zinc oxide particles having a substantially rod shape, said substantial rod shape comprising an elongated spherical shape.

2. The conductive fiber of claim 1 wherein said rod shaped particles have a substantially spherical cross-section with an aspect ratio of at least 2.

3. The conductive fiber of claim 2 wherein said particles have a length of less than 2000 nanometers, and a diameter of less than 1000 nanometers.

4. The conductive fiber of claim 3, said particles having a length of less than 300 nm and a diameter of less than 150 nm.

5. The conductive fiber of claim 4, said particles having a length of less than 300 nm and a diameter of less than 100 nm.

6. The conductive fiber of claim 4, said particles having a length of less than 200 nm and a diameter of less than 65 nm.

7. The conductive fiber of claim 3, said particles having a length between 2000 and 300 nm, inclusive, and a diameter between 1000 and 100 nm, inclusive.

8. The conductive fiber of claim 7, said particles having a length between 1000 and 450 nm, inclusive, and a diameter between 500 and 150 nm, inclusive.

9. The conductive fiber of claim 8, said length being 450 nm and said diameter being 150 nm.

10. The conductive fiber of claim 5 wherein said zinc oxide particles comprise 0.1–50% of said combination by weight.

11. The conductive fiber of claim 1, wherein said particles comprise a dopant.

12. The conductive fiber of claim 11, said dopant comprising titanium dioxide particles.

* * * * *

UNITED STATES PATENT AND TRADEMARK OFFICE
CERTIFICATE OF CORRECTION

PATENT NO. : 5,391,432
DATED : Feb. 21, 1995
INVENTOR(S) : Mark Mitchnick, et al.

Page 1 of 2

It is certified that error appears in the above-indentified patent and that said Letters Patent is hereby corrected as shown below:

Column 1, line 36, "4,9233,518" should read --4,923,518--.

Column 6, lines 47-48, "The theological" should read --The rheological--.

Column 8, line 11, "DH" should read --pH--.

Column 8, line 50, "or titanium, or" should read --or titanium dioxide, or--.

Column 8, line 64, "than" should read --then--.

Column 9, line 47, "form" should read --from--.

Column 15, line 41, "$10^8$ ω-cm," should read --$10^8$ Ω-cm,--.

Column 17, line 28, "selected" should read --select--.

Column 17, line 58, "ranged" should read --range--.

Column 18, line 58, "tension of relaxation" should read --tension or relaxation--.

Column 19, line 14, "mi/min," should read --m/min,--.

UNITED STATES PATENT AND TRADEMARK OFFICE
CERTIFICATE OF CORRECTION

PATENT NO. : 5,391,432
DATED : Feb. 21, 1995
INVENTOR(S) : Mark Mitchnick, et al.

It is certified that error appears in the above-indentified patent and that said Letters Patent is hereby corrected as shown below:

Column 20, lines 13-14, "90 parts of a random copolymer consisting of 90 parts of a random copolymer consisting of 75 parts" should read --90 parts of a random copolymer consisting of 75 parts--.

Column 20, line 39, "mylon-6 yarn" should read --nylon-6 yarn--.

Column 20, line 41, "one course, our" should read --one course, one---.

Signed and Sealed this

Third Day of October, 1995

Attest:

BRUCE LEHMAN

Attesting Officer

Commissioner of Patents and Trademarks